US012783048B2

(12) United States Patent
Morita

(10) Patent No.: US 12,783,048 B2
(45) Date of Patent: Nov. 3, 2026

(54) CONTROL DEVICE FOR CONTROLLING A HEAD-MOUNTED DISPLAY, CONTROL METHOD OF THE SAME, AND NON-TRANSITORY COMPUTER-READABLE MEDIUM

(71) Applicant: CANON KABUSHIKI KAISHA, Tokyo (JP)

(72) Inventor: Takuro Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/256,693

(22) Filed: Jul. 1, 2025

(65) Prior Publication Data

US 2026/0037063 A1 Feb. 5, 2026

(30) Foreign Application Priority Data

Aug. 1, 2024 (JP) ................................ 2024-126058

(51) Int. Cl.

| | |
|---|---|
| ***G06F 3/01*** | (2006.01) |
| ***G06F 3/14*** | (2006.01) |
| ***G06T 5/50*** | (2006.01) |
| ***H04N 23/667*** | (2023.01) |

(52) U.S. Cl.

CPC ................ *G06F 3/013* (2013.01); *G06F 3/14* (2013.01); *G06T 5/50* (2013.01); *H04N 23/667* (2023.01); *G06T 2207/10016* (2013.01); *G06T 2207/10144* (2013.01); *G06T 2207/20208* (2013.01); *G06T 2207/20212* (2013.01)

(58) Field of Classification Search

CPC . G06T 2207/10016; G06T 2207/10144; G06T 2207/20208; G06T 2207/20212; G06T 5/50; G06F 3/013; G06F 3/14; G06F 3/011; H04N 23/667

See application file for complete search history.

(56) References Cited

U.S. PATENT DOCUMENTS

| | | | | |
|---|---|---|---|---|
| 9,035,874 | B1 * | 5/2015 | Fowers | G06F 3/0481 345/156 |
| 12,326,980 | B2 | 6/2025 | Suetomi | |
| 2012/0162383 | A1 | 6/2012 | Kushida | |
| 2018/0063397 | A1 | 3/2018 | Sudou | |
| 2020/0342678 | A1 * | 10/2020 | Zhang | H04N 23/951 |
| 2023/0244318 | A1 | 8/2023 | Suetomi | |
| 2024/0064414 | A1 * | 2/2024 | Lee | G06V 10/141 |

FOREIGN PATENT DOCUMENTS

| | | | |
|---|---|---|---|
| JP | 2012-227846 | A | 11/2012 |
| JP | 2022-006502 | A | 1/2022 |

* cited by examiner

*Primary Examiner* — Robin J Mishler

(74) *Attorney, Agent, or Firm* — Venable LLP

(57) ABSTRACT

A control device according to the present disclosure includes one or more processors and/or circuitry configured to: execute setting processing of setting any of a plurality of modes including a first mode and a second mode, and execute control processing of performing control, in the first mode, to display an image captured by a first image sensor with a first image quality on a first display and to display an image captured by a second image sensor with the first image quality on a second display, and performing control, in the second mode, to stop one image sensor of the first image sensor and the second image sensor and to display an image captured by an other image sensor with a second image quality higher than the first image quality on the first display or the second display.

9 Claims, 6 Drawing Sheets

CONTROL DEVICE FOR CONTROLLING A HEAD-MOUNTED DISPLAY, CONTROL METHOD OF THE SAME, AND NON-TRANSITORY COMPUTER-READABLE MEDIUM

BACKGROUND

Field of the Technology

The present disclosure relates to a control device for controlling a head mounted display (HMD).

Description of the Related Art

A mixed reality (MR) technique utilizing an HMD which is a head mounted display has been proposed. In addition, a technique for recording, as a still image, a composite image obtained by compositing computer graphics (CG) and a background image has been proposed.

Japanese Patent Laid-Open No. 2022-006502 discloses a technique for setting a capturing mode using a hand gesture. Japanese Patent Laid-Open No. 2012-227846 discloses a technique for determining an imaging unit to be used in capturing a still image among two imaging units on the basis of image quality information of respective imaging units.

However, according to the related art disclosed in Japanese Patent Laid-Open No. 2022-006502 and Japanese Patent Laid-Open No. 2012-227846, a user may not be able to confirm an image with sufficiently high image quality when capturing (recording) the image (for example, a still image).

SUMMARY

The present disclosure provides a technique for enabling a user to confirm an image with sufficiently high image quality when capturing (recording) the image.

A control device according to the present disclosure, for controlling a head mounted display that includes a first imaging unit provided to correspond to a right eye of a user, a second imaging unit provided to correspond to a left eye of the user, a first display unit configured to present an image to the right eye of the user, and a second display unit configured to present an image to the left eye of the user, provides a first image sensor provided to correspond to a right eye of a user, a second image sensor provided to correspond to a left eye of the user, a first display that presents an image to the right eye of the user, and a second display that presents an image to the left eye of the user, the control device comprising one or more processors and/or circuitry configured to execute setting processing of setting any of a plurality of modes including a first mode and a second mode, and execute control processing of performing control, in the first mode, to display an image captured by the first image sensor with a first image quality on the first display and to display an image captured by the second image sensor with the first image quality on the second display, and performing control, in the second mode, to stop one image sensor of the first image sensor and the second image sensor and to display an image captured by an other image sensor with a second image quality higher than the first image quality on the first display or the second display.

Features of the present disclosure will become apparent from the following description of embodiments with reference to the attached drawings. The following description of embodiments is described by way of example.

DESCRIPTION OF THE EMBODIMENTS

First Embodiment

Figure 1:
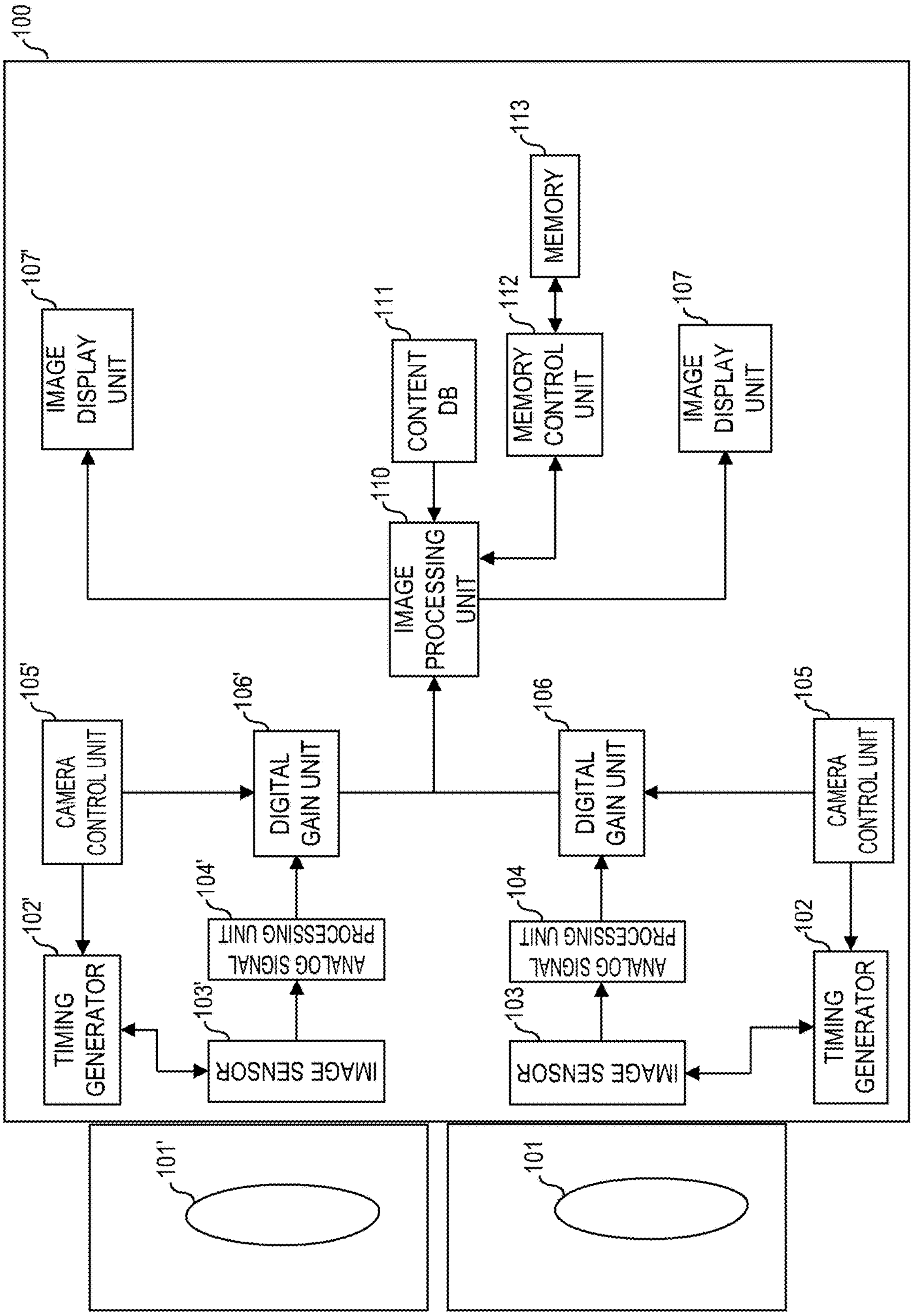
FIG. 1 is a block diagram of an HMD.

A first embodiment of the present disclosure will be described. FIG. 1 is a block diagram illustrating an HMD 100 according to the first embodiment.

A lens 101 is provided such that the lens corresponds to the left eye of a user with the HMD 100 mounted on their head. In addition, a lens 101' is provided such that the lens corresponds to the right eye of the user with the HMD 100 mounted on their head. The lenses 101 and 101' constitute a dual-lens capable of capturing a right image and a left image having parallax (background images). The reflected light from an object incident on the lens 101 forms an optical image on the image sensor 103. Similarly, the reflected light from the object incident on the lens 101' forms an optical image on the image sensor 103'. Timing generators 102 and 102' each generate a timing signal. The image sensors 103 and 103' are image sensors including a CCD, a CMOS element, or the like that converts an optical image into an electrical signal. The image sensor 103 operates on the basis of the timing signal output from the timing generator 102, and photoelectrically converts the formed image of the reflected light (the optical image of the object) into an analog signal.

An analog signal processing unit 104 converts the analog signal from the image sensor 103 into a digital signal through the A/D conversion to output the digital signal. A digital gain unit 106 performs predetermined signal processing on the digital signal output from the analog signal processing unit 104 to transmit the processed digital signal to an image processing unit 110. Similarly, an analog signal processing unit 104' converts the analog signal from the image sensor 103' into a digital signal to output the digital signal, and a digital gain unit 106' performs the predetermined signal processing on the digital signal output from the analog signal processing unit 104' to transmit the processed digital signal to the image processing unit 110.

A camera control unit 105 controls the timing generator 102, the image sensor 103, the analog signal processing unit 104, the digital gain unit 106, and the like. For example, the camera control unit 105 controls the charge accumulation time of the image sensor 103, and the gain of the digital gain unit 106. Similarly, a camera control unit 105' controls the timing generator 102', the image sensor 103', the analog signal processing unit 104', the digital gain unit 106', and the like.

An image display unit 107 is provided so as to present (display) an image to the left eye of the user with the HMD 100 mounted on their head. An image display unit 107' is provided so as to present an image to the right eye of the user with the HMD 100 mounted on their head. The image display unit 107 and 107' constitute a display element capable of providing binocular VR display and the like. An Electro Luminescence (EL) panel, an LCD, or the like can be applied as the display element, but the display element is not limited thereto. The binocular VR display is provided, for example, when a moving image of VR180 is played back and displayed on the HMD 100. The "binocular VR display" is provided by using a left-eye VR image and a right-eye VR image having parallax, thereby achieving stereoscopic viewing of the VR images.

The image processing unit 110 performs various types of image processing. For example, the image processing unit 110 performs image processing for canceling aberrations caused by the optical systems of the image sensor 103 and 103' and the optical systems of the image display unit 107 and 107', and image processing for compositing a digital image output from the digital gain unit 106 or 106' and freely-selected CG. Furthermore, the image processing unit 110 can acquire distance information of the environment where the user is located by distance measurement using a stereo camera (not illustrated) (or the image sensor 103 and 103'), and can acquire orientation information of the user from an orientation sensor (not illustrated). Thus, the image processing unit 110 can generate a video in which a CG object, not present on the spot, appears to exist on the spot, by changing the position, direction, and size of the CG to be composited using the distance information and the orientation information.

The image processing unit 110 can store (record) image data of a composite image (image obtained by compositing CG with an image of a real space) in a memory 113 via a memory control unit 112. Furthermore, the image processing unit 110 can also display the composite image on the image display unit 107 and 107'. The composite image obtained by compositing the digital image output from the digital gain unit 106 and CG is displayed on the image display unit 107, and the composite image obtained by compositing the digital image output from the digital gain unit 106' and CG is displayed on the image display unit 107'.

A content database (DB) 111 stores information such as CG images. The image processing unit 110 can switch CG data read from the content DB 111.

The image processing unit 110 also includes a function as a control unit that controls the entire HMD 100. The image processing unit 110 sets, as an operation mode of the HMD 100, any of a plurality of operation modes. The operation mode may be automatically set or may be set according to a user operation. According to the first embodiment, it is possible for the user to change settings such as the operation mode of the HMD 100 by using an operation unit (not illustrated). The plurality of operation modes includes, for example, a capturing mode and a playback mode. The capturing mode includes (1) a moving image capturing mode for capturing a moving image and (2) a still image capturing mode for capturing a still image. In the playback mode, the binocular VR display or the like is provided.

Figure 2:
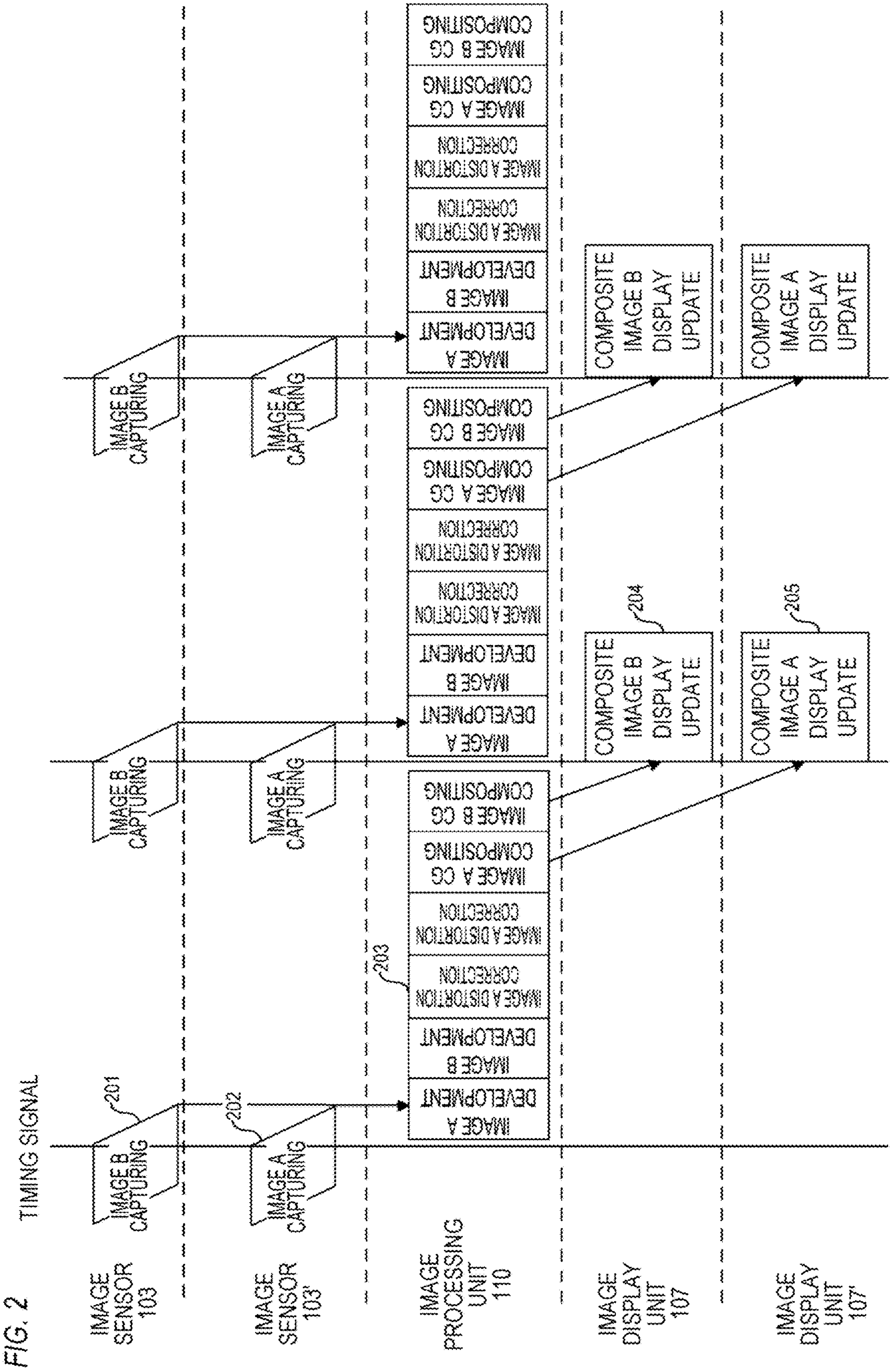
FIG. 2 is a timing chart illustrating a series of processing until a composite image is displayed.

FIG. 2 is a timing chart illustrating a series of processing until a composite image is displayed in the playback mode.

First, the image sensor 103, the analog signal processing unit 104, and the digital gain unit 106 perform acquisition processing 201 of RAW data of an image B which serves as a background image (captured image of a real space). Similarly, the image sensor 103', the analog signal processing unit 104', and the digital gain unit 106' perform acquisition processing 202 of RAW data of an image A which serves as a background image.

Next, the image processing unit 110 performs an image processing group 203 on the above-mentioned two pieces of RAW data. The image processing group 203 includes development processing, correction processing such as distortion correction processing, CG compositing processing, and the like. As a result, a composite image A obtained by compositing the image A and CG and a composite image B obtained by compositing the image B and CG can be acquired.

Finally, the image display unit 107 performs an update 204 of the display image to the composite image B output from the image processing unit 110. Similarly, the image display unit 107' performs an update 205 of the display image to the composite image A output from the image processing unit 110.

These types of processing are periodically performed according to the timing signal periodically output from the timing generator 102 and 102'.

Figure 3:
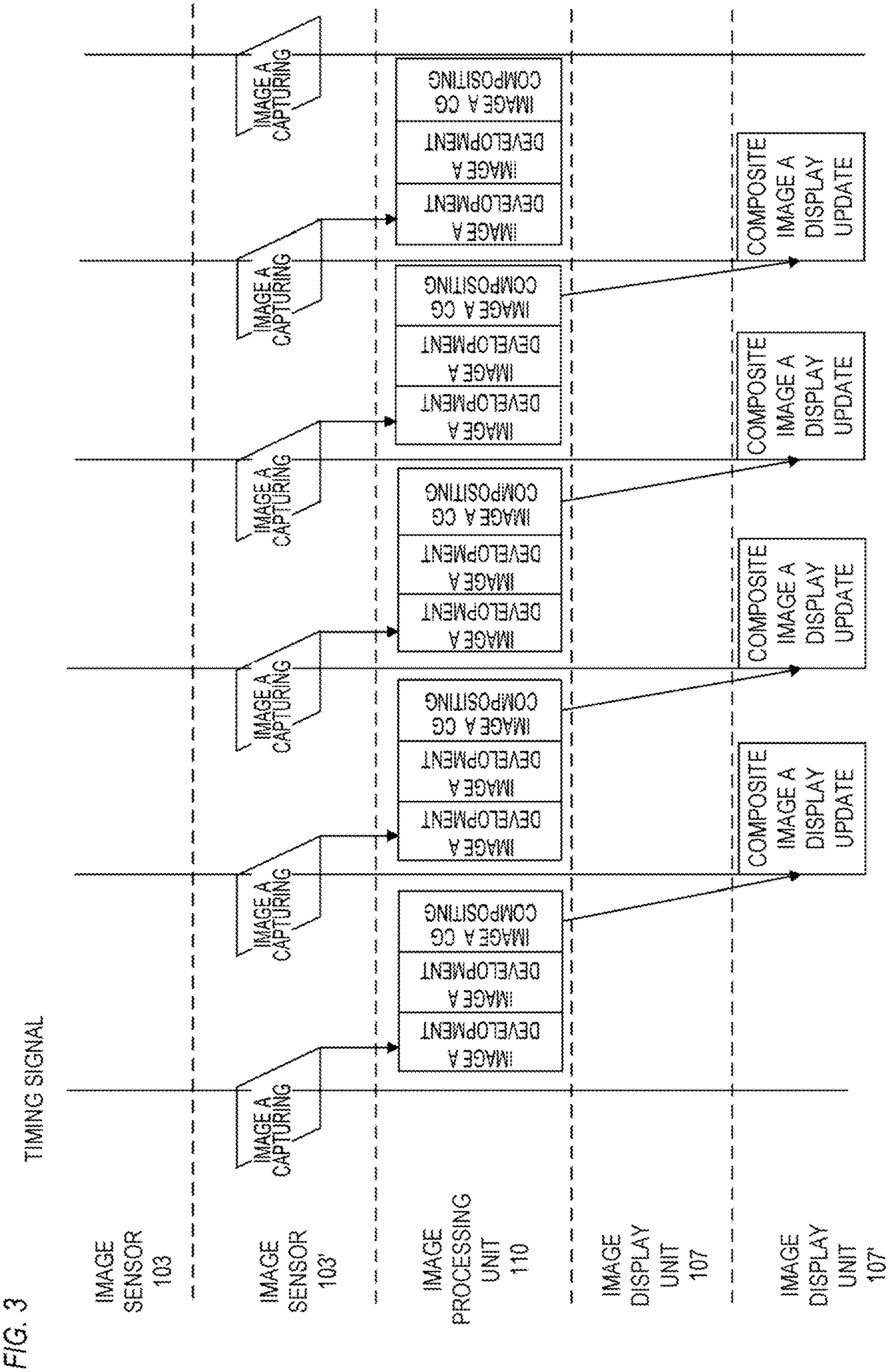
FIG. 3 is a timing chart illustrating a series of processing until a composite image is displayed.

FIG. 3 is a timing chart illustrating a series of processing until a composite image is displayed in the still image capturing mode. In the first embodiment, as illustrated in FIG. 3, the image sensor 103, the analog signal processing unit 104, the digital gain unit 106, and the image display unit 107 are stopped in the still image capturing mode. Then, the imaging frame rate of the image sensor 103' is changed to a frame rate higher than that used in the playback mode, and the background image acquired by the image sensor 103' (composite image based on the background image acquired by the image sensor 103') is displayed and recorded.

Alternatively, the image sensor 103', the analog signal processing unit 104', the digital gain unit 106', and the image display unit 107' may be stopped in the still image capturing mode. Then, the imaging frame rate of the image sensor 103' may be changed to a frame rate higher than that used in the playback mode, and the background image acquired by the image sensor 103 (composite image based on the background image acquired by the image sensor 103) may be displayed and recorded. Furthermore, similar processing may also be performed in the moving image capturing mode to record the moving image.

Figure 4:
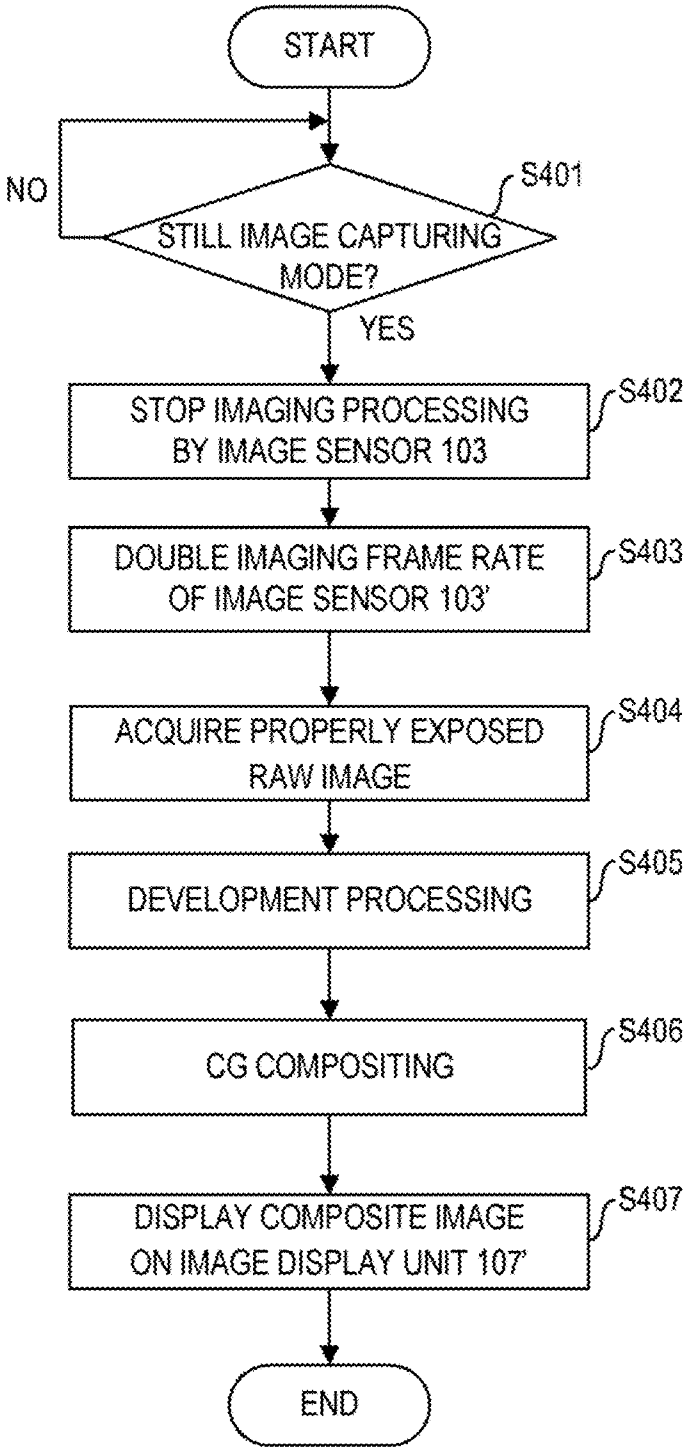
FIG. 4 is a flowchart in a first embodiment.

FIG. 4 is a flowchart illustrating a series of processing from acquiring a background image to displaying a composite image In S401, the image processing unit 110 (control unit) determines whether or not the current operation mode of the HMD 100 is the still image capturing mode. The image processing unit 110 waits for the still image capturing mode to be set, and the process proceeds to S402 once the still image capturing mode is set.

In S402, the camera control unit 105 stops imaging processing by the image sensor 103, and the like.

In S403, the camera control unit 105' changes the imaging frame rate of the image sensor 103' to twice the frame rate used in the playback mode. Note that it is only required that the changed imaging frame rate of the image sensor 103' be higher than that used in the playback mode, and the changed imaging frame rate is not limited to twice the frame rate used in the playback mode.

In S404, the camera control unit 105' sets a gain corresponding to the imaging frame rate set in S403 in the digital gain unit 106'. As a result, a properly exposed RAW image (background image) can be acquired.

In S405, the image processing unit 110 performs image processing such as the development processing and the distortion correction processing on the RAW image (background image) acquired in S404.

In S406, the image processing unit 110 performs the CG compositing processing on the background image after the image processing in S405.

In S407, the image processing unit 110 displays the composite image generated in S406 on the image display unit 107'. The composite image generated in S406 may be displayed on the image display unit 107, or may be displayed on the image display unit 107 and the image display unit 107'. In addition, the image processing unit 110 records the composite image generated in S406 in the memory 113 as a still image in accordance with a capturing instruction from the user. The composite image may be recorded in an internal storage medium such as the memory 113 or may be recorded in an external storage medium.

As described above, according to the first embodiment, by stopping one of the two image sensors, the image quality of the image captured by the other image sensor can be significantly improved. As a result, it is possible to display or record an image with sufficiently high image quality when capturing (recording) the image. In the first embodiment, an image can be displayed at a very high frame rate. In the case of moving image capturing, a moving image with a very high frame rate can be recorded.

Second Embodiment

Figure 5:
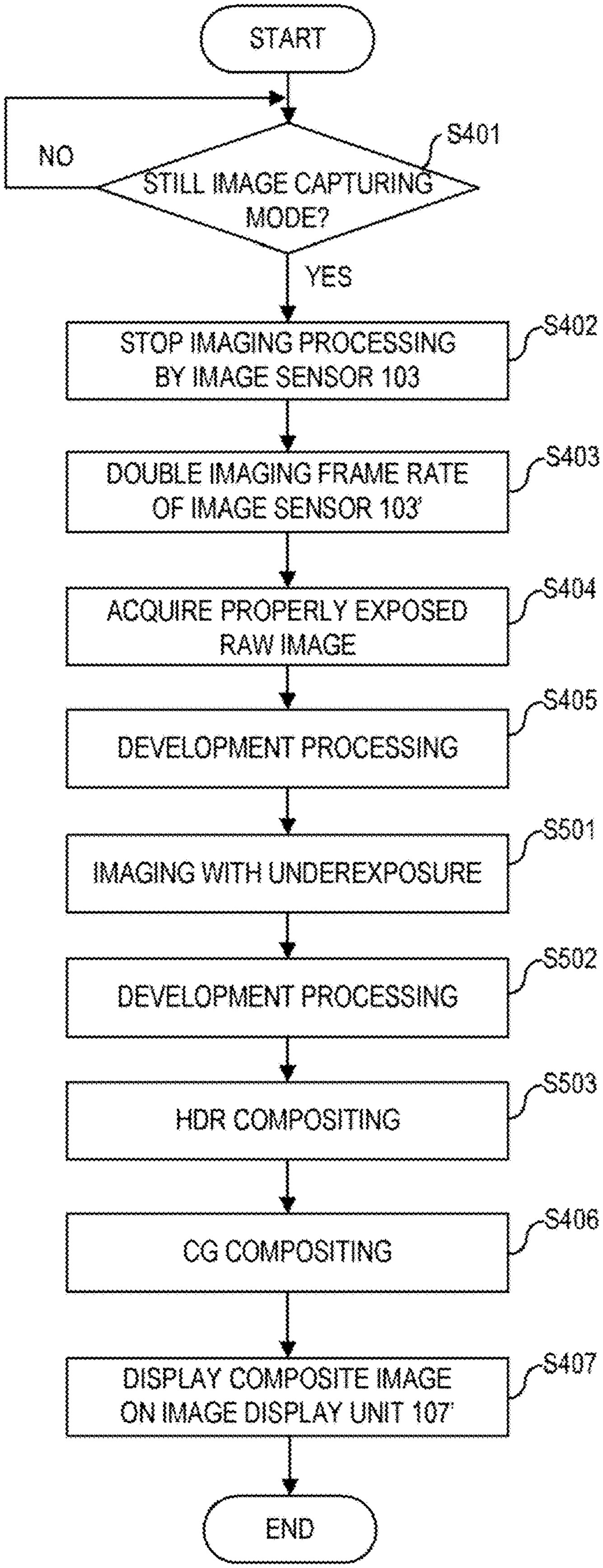
FIG. 5 is a flowchart in a second embodiment.

A second embodiment of the present disclosure will be described. In the first embodiment, the image quality is improved by increasing the imaging frame rate. In the second embodiment, the image quality is improved by HDR compositing through which sequentially captured two images with different exposures are composited. FIG. 5 is a flowchart, in the second embodiment, illustrating a series of processing from acquiring a background image to displaying a composite image.

In S401 to S405, processing similar to the processing performed in the first embodiment (FIG. 4) is performed.

In S501, the camera control unit 105 sets a gain lower than that in S404 in the digital gain unit 106'. As a result, a RAW image (background image) with an exposure darker than the proper exposure (underexposure) can be acquired.

In S502, the image processing unit 110 performs the image processing such as the development processing and the distortion correction processing on the RAW image (background image) acquired in S501.

In S503, the image processing unit 110 performs HDR compositing, through which the properly exposed RAW image (background image) acquired in S404 and the underexposed RAW image (background image) acquired in S501 are composited.

In S406 and S407, processing similar to the processing performed in the first embodiment (FIG. 4) is performed. However, in S406, the CG compositing processing is performed on the background image acquired through the HDR compositing in S503.

As described above, according to the second embodiment, the imaging frame rate is set to twice the frame rate, and the HDR compositing with the properly exposed image and the underexposed image is performed. As a result, it is possible to display an image with a wide dynamic range while maintaining the display frame rate.

Third Embodiment

Figure 6:
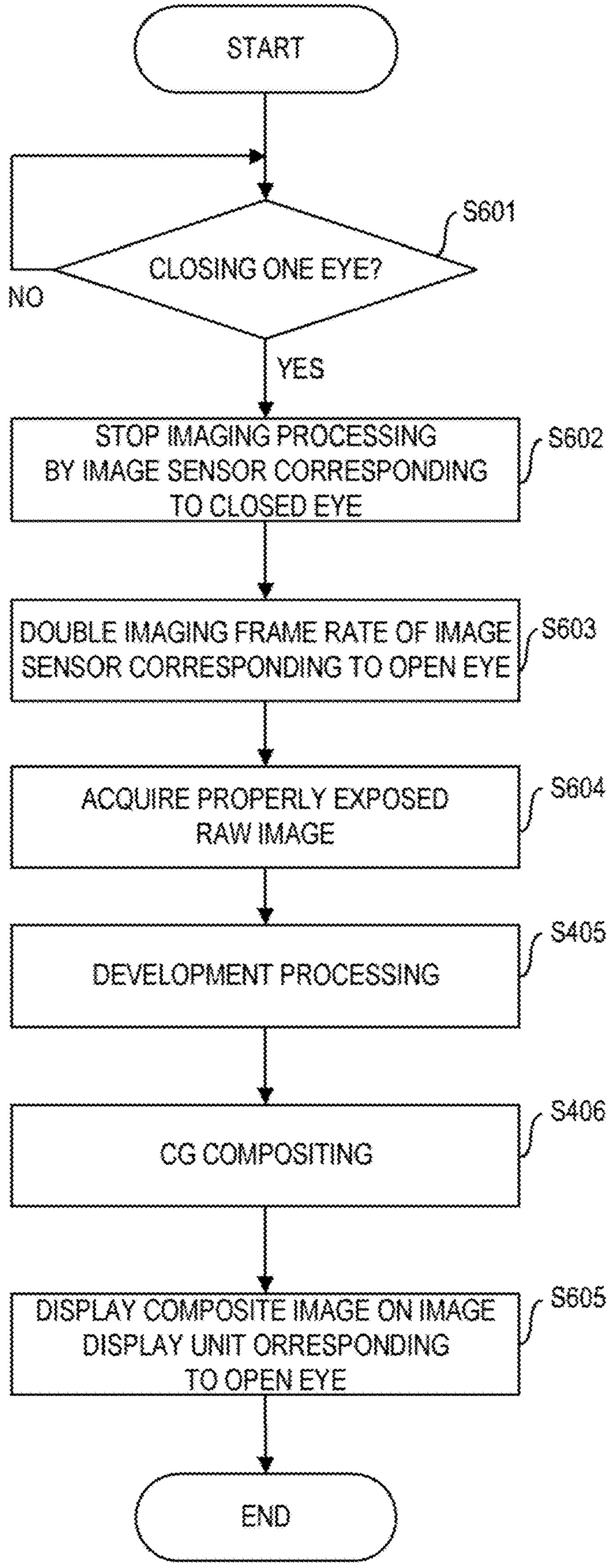
FIG. 6 is a flowchart in a third embodiment.

A third embodiment of the present disclosure will be described. In the first embodiment, the still image capturing mode is set according to the user operation. In the third embodiment, one eye closure by the user is detected, and the still image capturing mode is set (operation similar to the operation during the still image capturing mode in the first embodiment is performed). FIG. 6 is a flowchart, in the third embodiment, illustrating a series of processing from detecting the user closing one eye to displaying a composite image.

In S601, the image processing unit 110 (control unit) determines whether or not the user of the HMD 100 closes one eye on the basis of information of a pupil state detection camera (not illustrated). The image processing unit 110 waits for the user to close one eye, and the process proceeds to S602 once the user closes one eye.

In S602, a camera control unit corresponding to the closed eye, either the camera control unit 105 or the camera control unit 105', stops the imaging processing by an image sensor corresponding to the closed eye, either the image sensor 103 or the image sensor 103'.

In S603, the camera control unit corresponding to the open eye, either the camera control unit 105 or the camera control unit 105', changes the imaging frame rate of the image sensor corresponding to the open eye, either the image sensor 103 or the image sensor 103', to twice the frame rate used in the playback mode.

In S604, the camera control unit corresponding to the open eye sets a gain corresponding to the imaging frame rate set in S603 in the digital gain unit 106'. As a result, a properly exposed RAW image (background image) can be acquired.

In S405 and S406, processing similar to the processing performed in the first embodiment (FIG. 4) is performed.

In S605, the image processing unit 110 displays the composite image generated in S406 on the image display unit corresponding to the open eye, either the image display unit 107 or the image display unit 107'.

As described above, according to the third embodiment, the operation during the still image capturing mode is automatically performed in response to one eye closure by the user, so that the user can save the trouble of switching the operation mode using the setting screen and the like.

Although in the first to third embodiments, imaging by one of the two image sensors is stopped and the imaging frame rate of the other image sensor is increased, the method for improving the image quality in imaging is not limited thereto. For example, imaging by one of the two image sensors is stopped, and the imaging resolution of the other image sensor may be increased. There may be the mode for increasing the frame rate and the mode for increasing the resolution.

The camera control unit 105 and 105' and the image processing unit 110 may be built in the HMD 100 or may be provided in an external device of the HMD100 (for example, a personal computer or a controller connected to the HMD100 in a wired or wireless manner).

According to the present disclosure, a user can confirm an image with sufficiently high image quality when capturing (recording) the image.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

The embodiment described above (including variation examples) is merely an example. Any configurations obtained by suitably modifying or changing some configurations of the embodiment within the scope of the subject matter of the present disclosure are also included in the present disclosure. The present disclosure also includes other configurations obtained by suitably combining various features of the embodiment.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-126058, filed on Aug. 1, 2024, which is hereby incorporated by reference herein in its entirety.

What is claimed is:

1. A control device for controlling a head mounted display that includes (1) a first image sensor provided to correspond to a right eye of a user, (2) a second image sensor provided to correspond to a left eye of the user, (3) a first display configured to present an image to the right eye of the user, and (4) a second display configured to present an image to the left eye of the user, the control device comprising:

one or more processors and/or circuitry configured to:

(1) execute setting processing of setting any of a plurality of modes including a first mode and a second mode; and (2) execute control processing of (a) performing control, in the first mode, to display an image captured by the first image sensor with a first image quality on the first display and to display an image captured by the second image sensor with the first image quality on the second display, and (b) performing control, in the second mode, to stop one image sensor of the first image sensor and the second image sensor and to display an image captured by the other image sensor of the first image sensor and the second image sensor with a second image quality higher than the first image quality on the first display or the second display, wherein the first mode is a playback mode, wherein the second mode is a capturing mode, and wherein in the control processing in the second mode, control is performed to (1) perform HDR compositing through which two images with different exposures that are sequentially captured by the other image sensor are composited, and (2) display an image acquired through the HDR compositing on the first display or the second display.

2. The control device according to claim 1, wherein the image captured with the first image quality is an image captured at a first frame rate, and wherein the image captured with the second image quality is an image captured at a second frame rate higher than the first frame rate.

3. The control device according to claim 2, wherein the second frame rate is a frame rate twice the first frame rate.

4. The control device according to claim 1, wherein the image captured with the first image quality is an image captured with a first resolution, and wherein the image captured with the second image quality is an image captured with a second resolution higher than the first resolution.

5. The control device according to claim 2, wherein the plurality of modes further includes a third mode, wherein the image captured with the first image quality is an image captured with a first resolution, and wherein in the third mode, control is performed to stop one image sensor of the first image sensor and the second image sensor and to display an image captured by the other image sensor with a second resolution higher than the first resolution on the first display or the second display.

6. The control device according to claim 1, wherein the second mode is a still image capturing mode.

7. The control device according to claim 1, wherein the one or more processors and/or circuitry are further configured to execute detection processing of detecting the user closing one eye, and wherein in a case where the user closing one eye is detected in the detection processing, the second mode is set in the setting processing.

8. A control method of a head mounted display that includes (1) a first image sensor provided to correspond to a right eye of a user, (2) a second image sensor provided to correspond to a left eye of the user, (3) a first display configured to present an image to the right eye of the user, and (4) a second display configured to present an image to the left eye of the user, the control method comprising:

setting any of a plurality of modes including a first mode and a second mode;

performing control, in the first mode, to display an image captured by the first image sensor with a first image quality on the first display and to display an image captured by the second image sensor with the first image quality on the second display; and performing control, in the second mode, to stop one image sensor of the first image sensor and the second image sensor and to display an image captured by the other image sensor of the first image sensor and the second image sensor with a second image quality higher than the first image quality on the first display or the second display, wherein the first mode is a playback mode, wherein the second mode is a capturing mode, and wherein in the second mode, control is performed to (1) perform HDR compositing through which two images with different exposures that are sequentially captured by the other image sensor are composited, and (2) display an image acquired through the HDR compositing on the first display or the second display.

9. A non-transitory computer-readable medium that stores a program, wherein the program causes a computer to execute a control method of a head mounted display that includes (1) a first image sensor provided to correspond to a right eye of a user, (2) a second image sensor provided to correspond to a left eye of the user, (3) a first display configured to present an image to the right eye of the user, and (4) a second display configured to present an image to the left eye of the user, the control method comprising:

setting any of a plurality of modes including a first mode and a second mode;

performing control, in the first mode, to display an image captured by the first image sensor with a first image quality on the first display and to display an image captured by the second image sensor with the first image quality on the second display; and performing control, in the second mode, to stop one image sensor of the first image sensor and the second image sensor and to display an image captured by the other image sensor of the first image sensor and the second image sensor with a second image quality higher than the first image quality on the first display or the second display, wherein the first mode is a playback mode, wherein the second mode is a capturing mode, and wherein in the second mode, control is performed to (1) perform HDR compositing through which two images with different exposures that are sequentially captured by the other image sensor are composited, and (2) display an image acquired through the HDR compositing on the first display or the second display.

* * * * *